June 12, 1923.
J. S. DONALDSON
TOOL
Original Filed Feb. 8, 1921
1,458,171
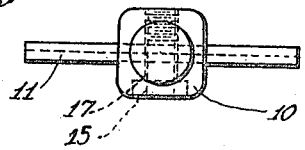
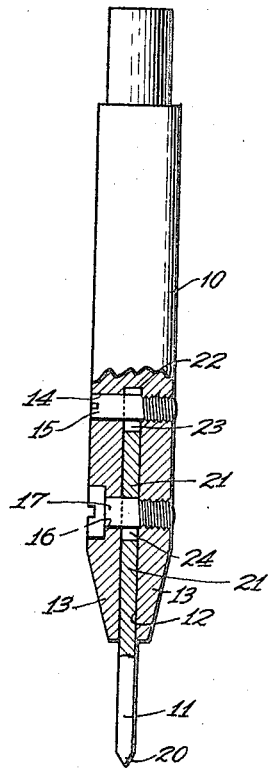
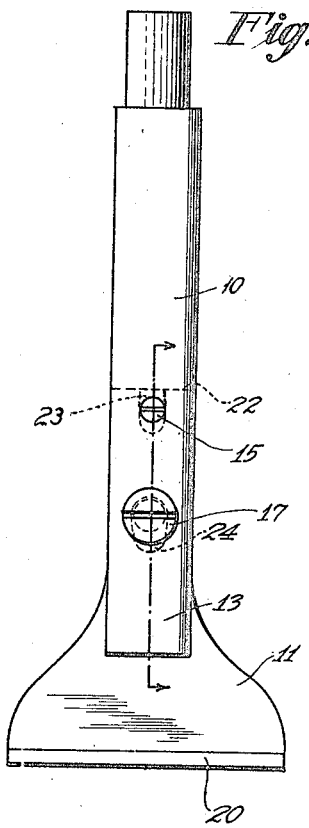
INVENTOR
John S. Donaldson
BY
Arthur L. Kent
his Atty.

Patented June 12, 1923.

1,458,171

UNITED STATES PATENT OFFICE.

JOHN S. DONALDSON, OF NEW YORK, N. Y.

TOOL.

Application filed February 8, 1921, Serial No. 443,322. Renewed February 14, 1923.

*To all whom it may concern:*

Be it known that I, JOHN S. DONALDSON, a citizen of the United States, residing at New York city, in the county of Queens and State of New York, have invented certain new and useful Improvements in Tools, fully described and represented in the following specification and the accompanying drawings, forming a part of the same.

This invention relates to tools, and particularly to hammer driven tools, and has for an object to provide a tool with an operative portion which may be changed or renewed.

The tools which have heretofore customarily been used in connection with pneumatic hammers, or in connection with hand hammers, or other pounding means, and which may in general be termed "hammer driven tools," have been made of a single piece of metal. Such tools have comprised a shank and a cutting blade, hammer head, tamping plate, or other operative portion made integral with the shank. As different classes of work require different operative portions it has been necessary to provide a complete tool including the shank for each class of work. Furthermore, when the chisel blade, or other operative portion of such tools has become worn, broken, or otherwise damaged by use, it has been necessary to discard the entire tool, notwithstanding the fact that the shank has remained in as good condition as when it was first made.

According to the present invention the operative portion of the tool is made separable from the shank of the tool. Means are provided for connecting the two parts so securely that the tool withstands the repeated blows to which it is subjected in operation as well as a tool formed of a single piece of metal. With the new tool, however, it is possible to make use of a single shank for all classes of work by merely changing the operative portion attached to it. Furthermore, when the operative portion has become worn or damaged by use it may be removed from the shank and replaced by a new operative portion. A single shank may thus be used for an indefinite period, thus greatly reducing the replacement expense in hammer driven tools.

In order that the invention may clearly be understood, I will describe in detail a specific embodiment of it which is illustrated in the accompanying drawings, in which:—

Fig. 1 is a side view of a tool embodying the invention, partly sectioned on the line 1—1 of Fig. 2;

Fig. 2 is a side view of the tool shown in Fig. 1 looking at right angles to the direction from which Fig. 1 is taken; and Fig. 3 is a top view of the tool shown in Figs. 1 and 2.

The tool consists of a shank 10 and a separate operative portion 11. The shank 10 illustrated in the drawings, has its upper end formed for use with a pneumatic hammer of ordinary construction. If desired, however, the upper end of the shank may be headed so as to adapt it to use in connection with hand hammers. So far as the present invention is concerned the particular form of the upper or blow receiving end of the shank is immaterial. The lower portion of the shank 10 is bifurcated by a slot 12. The lower portions 13 of the shank at each side of the slot 12 are slightly tapered. Near the upper edge of the slot 12 is a transverse bore 14 perpendicular to the slot. A stud 15 is fixed in this bore and extends across the upper end of the slot. For convenience in manufacture, the bore 14 may be tapped on one side of the slot and the stud 15 threaded at one end and provided at its other end with a screw driver slot, as shown in the drawings. Below the bore 14 is a transverse hole 16 which is also perpendicular to the slot. The portion of the hole 16 at one side of the slot is tapped while the opposite end of the hole is countersunk to provide space for the head of a threaded bolt 17 which may be inserted in the hole 16 and screwed into the threaded portion of the hole. It is apparent that screwing the bolt 17 into the hole 16 will serve to draw together the portions 13 of the shank.

The operative member 11, which, in the form shown in the drawings, consists of a cutting blade, has at its lower edge a cutting edge 20 similar to that of an ordinary chisel. At the upper edge of the member 11 is a flat projection 21 adapted to fit into the slot 12 of the shank 10. The upper edge 22 of the projection 21 fits against the end of the slot 12. In the edge 22 is a U-shaped recess 23 which fits around the stud 15 and restrains the upper portion of the projection against lateral movement in the shank. Below the recess 23 the projection 21 contains a transverse hole 24 which registers with the hole 16 in the shank when the projection is inserted in the slot. In order to insure the close fitting of the upper edge 22 and the end of the slot, the recess 23 and the hole 24 are slightly elongated so that the projection 21 does not come into contact with the lower side of either the stud 15 or the screw 17. The sides of the recess and hole, however, engage the sides of the stud and screw, thus restraining the projection 21 and the member 11 against any twisting or lateral movement in the shank.

After the projection 21 of the member 11 has been placed in the slot 12 of the shank, the screw 17 is inserted through the holes 16 and 24 and screwed tightly into the threaded portion of the hole 16. This draws the portions 13 of the shank tightly together, clamping the projection 21 between them and firmly securing the member 11 in place in the shank. The force of the hammer blows upon the shank is transmitted to the operative member 11 through the contact of the upper edge 22 of the projection 21 with the end of the slot 12. Owing to the clearance hereinbefore mentioned, these blows do not cause a strain upon either the stud 15 or the screw 17. The continued vibration to which the entire tool is subjected does not loosen the member 11 in the shank 10. The elasticity of the bifurcated portion of the shank and of the projection 21 of the member 11 exert a constant endwise strain upon the bolt 17 after it has been screwed in so as to clamp the parts together, and this strain prevents the bolt 17 from unscrewing under the vibration to which the tool is subjected.

It is to be understood that other operative members in addition to the member 11 illustrated in the drawings may be supplied for use with the shank 10 so as to adapt the tool to cutting of all kinds as well as to hammering the heads of rivets, and tamping, or other pounding work. For certain types of work, it is desirable to strengthen the operative member by making the portion thereof below the projection which extends into the slot of the shank thicker than this projection. In all cases, however, the projection is made of such length that its end firmly engages the end of the slot. As the sides of the projection as well as the sides of the slot are parallel, the operative member does not become wedged into the slot by repeated hammering. Even after long use, therefore, the operative member may be removed from the shank by merely loosening and taking out the bolt 17 and in this way the tool may be quickly and easily adapted to work of different classes and new operative members may be substituted for damaged or worn out operative members.

It should be clearly understood that the invention is by no means limited to the details of construction described, as the invention affords, it is believed, that first practical hammer-driven tool in which the operative portion of the tool may be changed or renewed.

What is claimed is:

1. A hammer-driven tool, comprising a shank bifurcated at its outer end by a longitudinal slot of uniform width and having a transverse hole in its bifurcated portion, an operative member having a flat projection with substantially parallel sides throughout a range essentially greater than the depth of the slot and adapted to enter said slot and engage the inner end of the slot and having a transverse hole registering with the hole in the shank, and a clamping bolt extending through said holes, the hole in the projection being elongated longitudinally of the tool so that while the sides of the aperture engage said bolt a clearance is provided between the lower end of the aperture and the bolt.

2. A hammer-driven tool, comprising a shank bifurcated at its outer end by a longitudinal slot of uniform width and having a transverse hole for a clamping bolt in its bifurcated portion, a stud fixed in said shank and extending across said slot near its inner end, an operative member having a flat projection with substantially parallel sides throughout a range essentially greater than the depth of the slot and adapted to enter said slot and engage the inner end of the slot and having at its end an elongated recess, the sides of which engage said stud while a clearance is allowed between the end of the recess and the stud, and having a hole registering with said transverse hole in the shank, and a clamping screw extending through said holes, said hole in the projection being elongated longitudinally of the tool so that while its sides engage the clamping bolt a clearance is allowed between its lower end and the clamping bolt.

In testimony whereof I have hereunto set my hand in the presence of two subscribing witnesses.

JOHN S. DONALDSON.

Witnesses:
MAISIE MAURUS,
A. JARECKY.